T. C. Barton,
Bending Tires,
N⁰ 322.
Patented July 31, 1837.
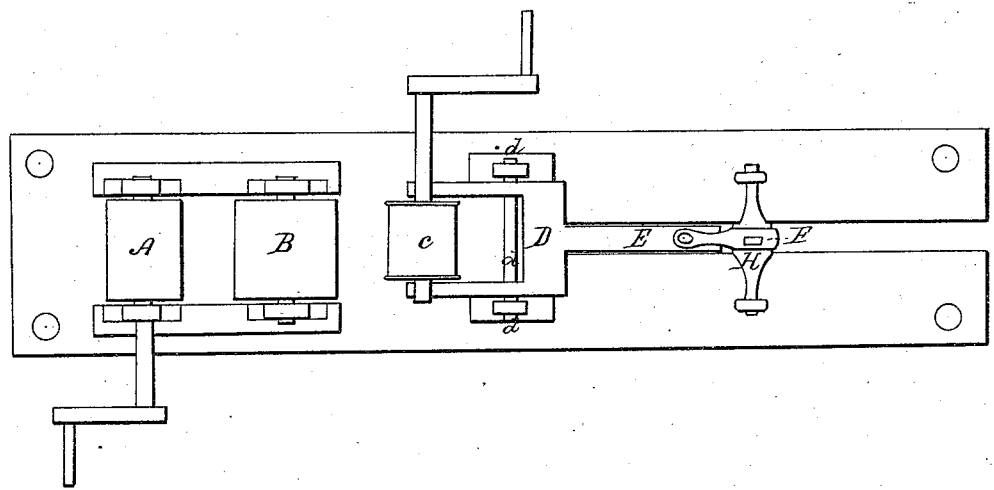
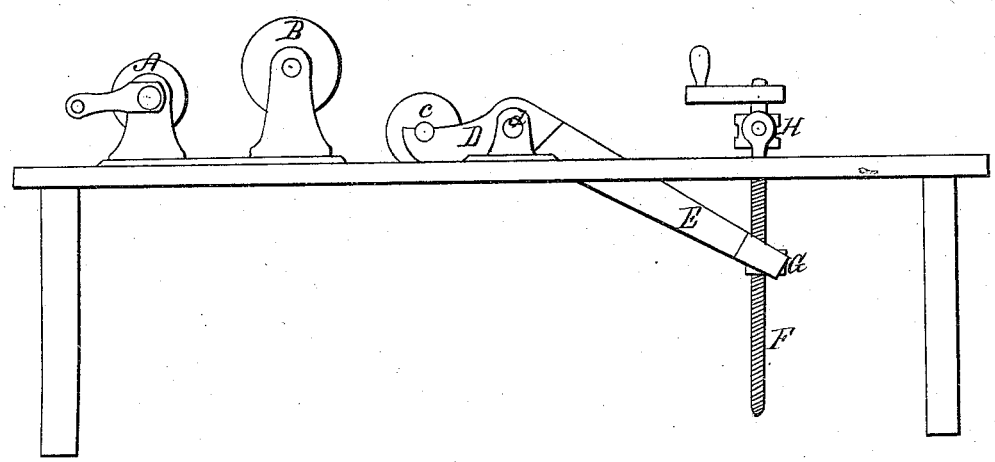

UNITED STATES PATENT OFFICE.

THOMAS C. BARTON, OF NEW YORK, N. Y.

MACHINE FOR BENDING THE TIRES OF WHEELS AND OTHER ARTICLES.

Specification of Letters Patent No. 322, dated July 31, 1837.

*To all whom it may concern:*

Be it known that I, THOMAS C. BARTON, of the city of New York, in the State of New York, have invented an Improvement in Machines for Bending Tires for Carriage-Wheels and for other Purposes.

The accompanying drawing represents a side view of the bench which supports the rollers, and their appendages, by which the bending is effected.

A, B, C, are three rollers, two of which, A, and B, merely revolve upon their axes; but the third roller C, revolves upon a movable frame A, admitting of its being raised, or lowered, at pleasure, and thereby adapting it to the curvature which is to be given to the tire.

D, is the frame which supports the gudgeons of the roller C, this frame turning on gudgeons d, in suitable standards affixed upon the bench. From the back end of the movable frame, the lever, or tail-piece, E, extends under the bench, where it is raised, or lowered, by means of the screw F; in the end G, of the lever, there is a nut, which swivels upon pins, and above the bench there is a shaft, H, which has a hole through it to receive the shank of the screw, which turns freely in it, whilst it is kept in its place by a collet, or pin. This shaft also swivels upon pins, or gudgeons, admitting of the turning of the screw in it, and in the nut below, without cramping. It will be manifest that by this arrangement the roller C, may be raised, or lowered, at pleasure, and that it will be retained permanently, and steadily, by means of the screw, in any position in which it may be placed.

The rollers, A, and C, are furnished with winches for the purpose of turning them, and thereby carrying the tire forward.

What I claim as my invention, is simply—

The particular construction and arrangement of the roller C, with its frame, lever, and regulating screw, operating substantially in the manner described. The use of three rollers for the purpose of bending tire, and other articles, is a well-known device, and the mere making of one of the rollers adjustable is not new, and these, therefore, I do not intend to claim, but limit myself in this particular to the mode above stated of effecting this object.

THOS. C. BARTON.

Witnesses:
THOS. P. JONES,
W. THOMPSON.